United States Patent
Hsu et al.

(10) Patent No.: US 11,437,207 B2
(45) Date of Patent: Sep. 6, 2022

(54) POSITIONING MEMBER AND KEYBOARD CONTAINING THE SAME

(71) Applicants: LITE-ON ELECTRONICS (GUANGZHOU) LIMITED, Guangzhou (CN); Lite-On Technology Corporation, Taipei (TW)

(72) Inventors: Kuo-Hui Hsu, Taipei (TW); Cheng-Kun Liao, Taipei (TW); Li-Sheng Hsiao, Taipei (TW); En-Huei Wang, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 17/343,740

(22) Filed: Jun. 10, 2021

(65) Prior Publication Data

US 2021/0304982 A1  Sep. 30, 2021

Related U.S. Application Data

(63) Continuation of application No. 17/020,788, filed on Sep. 14, 2020, now Pat. No. 11,061,483.
(Continued)

(30) Foreign Application Priority Data

Jul. 23, 2020 (CN) .......................... 202010727764.6

(51) Int. Cl.
*H01H 13/705* (2006.01)
*H01H 3/12* (2006.01)
(Continued)

(52) U.S. Cl.
CPC ......... *H01H 13/705* (2013.01); *G06F 3/0213* (2013.01); *H01H 3/122* (2013.01);
(Continued)

(58) Field of Classification Search
None
See application file for complete search history.

(56) References Cited

U.S. PATENT DOCUMENTS

2016/0109636 A1* 4/2016 Weng .................... G02B 6/005
362/23.03

FOREIGN PATENT DOCUMENTS

| CN | 201438431 | 4/2010 |
| CN | 102119430 | 7/2011 |

(Continued)

OTHER PUBLICATIONS

"Office Action of China Counterpart Application", dated Jul. 1, 2022, p. 1-p. 7.

*Primary Examiner* — Aneeta Yodichkas
(74) *Attorney, Agent, or Firm* — JCIPRNET

(57) ABSTRACT

The disclosure provides a keyboard includes a bottom plate, a key unit and a shielding layer. The bottom plate includes a body part and a through hole. The key unit is disposed on the body part. The shielding layer covers a portion of the bottom plate and comprising a main part disposed on the body part and an extension part extending from the main part toward the through hole, wherein the extension part has a hole with a size larger than or substantially equal to a size of the through hole.

7 Claims, 7 Drawing Sheets

Related U.S. Application Data

(60) Provisional application No. 62/903,766, filed on Sep. 21, 2019.

(51) Int. Cl.
    *H01H 9/02*         (2006.01)
    *H01H 13/12*       (2006.01)
    *H01H 21/24*       (2006.01)
    *H01H 21/36*       (2006.01)
    *H01H 13/703*      (2006.01)
    *H01H 13/7065*     (2006.01)
    *G06F 3/02*         (2006.01)

(52) U.S. Cl.
    CPC .............. *H01H 3/125* (2013.01); *H01H 9/02* (2013.01); *H01H 13/12* (2013.01); *H01H 13/703* (2013.01); *H01H 13/7065* (2013.01); *H01H 21/24* (2013.01); *H01H 21/36* (2013.01); *H01H 2009/0278* (2013.01)

(56) References Cited

FOREIGN PATENT DOCUMENTS

| | | |
|---|---|---|
| CN | 202585212 | 12/2012 |
| CN | 202721059 | 2/2013 |
| CN | 103871771 | 6/2014 |

\* cited by examiner

POSITIONING MEMBER AND KEYBOARD CONTAINING THE SAME

CROSS-REFERENCE TO RELATED APPLICATION

This is a continuation application of patent application Ser. No. 17/020,788, filed on Sep. 14, 2020, which claims the priority benefit of U.S. application Ser. No. 62/903,766, filed on Sep. 21, 2019, and China application serial no. 202010727764.6, filed on Jul. 23, 2020. The entirety of the above-mentioned patent application is hereby incorporated by reference herein and made a part of this specification.

BACKGROUND

Technical Field

The disclosure relates to an electronic component, in particular to a positioning member and a keyboard containing the same.

Related Art

As the design of electronic product is becoming lighter and thinner, the bonding technology that uses screws and nuts to lock the housing has gradually been replaced by heat staking technology. In general, the heat staking technology inserts a positioning column made of heat staking material into the positioning hole of the target positioning member, and then melt the end of the positioning column into a head so as to facilitate the bonding of the separated parts.

Generally speaking, the head is often exposed form the positioning hole of the positioning member such that the exposed head may be seen by the user and degrade the aesthetics during use. Therefore, the disclosure intends to prevent the exposed head from being seen during use and upgrade the aesthetics for better user experience.

SUMMARY

The disclosure is directed to a positioning member and a keyboard containing the positioning member capable of upgrading the aesthetics during use for better user experience.

According to the embodiments of the disclosure, a positioning member includes a bottom plate and a shielding layer. The bottom plate includes a body part and a protruding part. The body part has a connection part. The protruding part has a through hole. The body part is upwardly connected to the protruding part through the connection part, such that the body part, the connection part, and the protruding part jointly enclose an accommodating space below the through hole. An joint member having a stud and a head connected to the stud, wherein the stud passes through the through hole to be fixed in the accommodating space via the head. The shielding layer is disposed on the body part, partly extending to the through hole of the protruding part to shield the protruding part exposed by the joint member.

According to the embodiments of the disclosure, a keyboard includes a housing, multiple key units, a frame, and the positioning member. The multiple key units are disposed in the housing. The multiple key units move up and down relative to the housing to activate corresponding key switches. The frame has multiple openings for respectively exposing the multiple key units. The frame is stacked on the housing. The joint member and the positioning member are respectively disposed on the frame and the housing, such that the housing and the frame are engaged by the positioning member.

Based on the above, in the design of the positioning member of the disclosure, the shielding layer is disposed on the body part of the bottom plate, partly extending the through hole of the protruding part to shield the protruding part exposed by the joint member. Therefore, the keyboard containing the shielding layer can prevent the protruding part from being seen during use and upgrade the aesthetics for better user experience.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
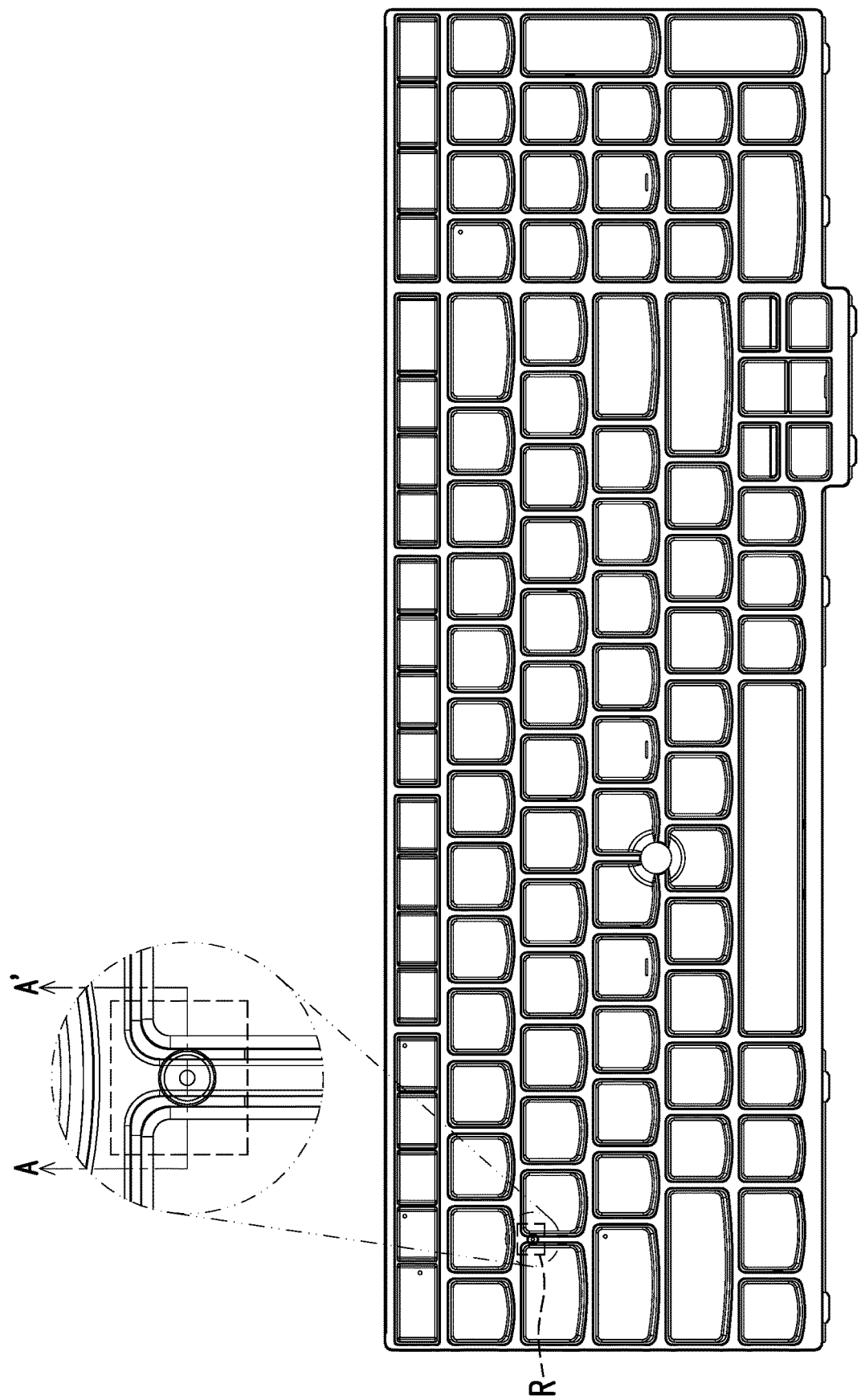
FIG. 1 is a schematic top view of a keyboard according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like parts.

Figure 2:
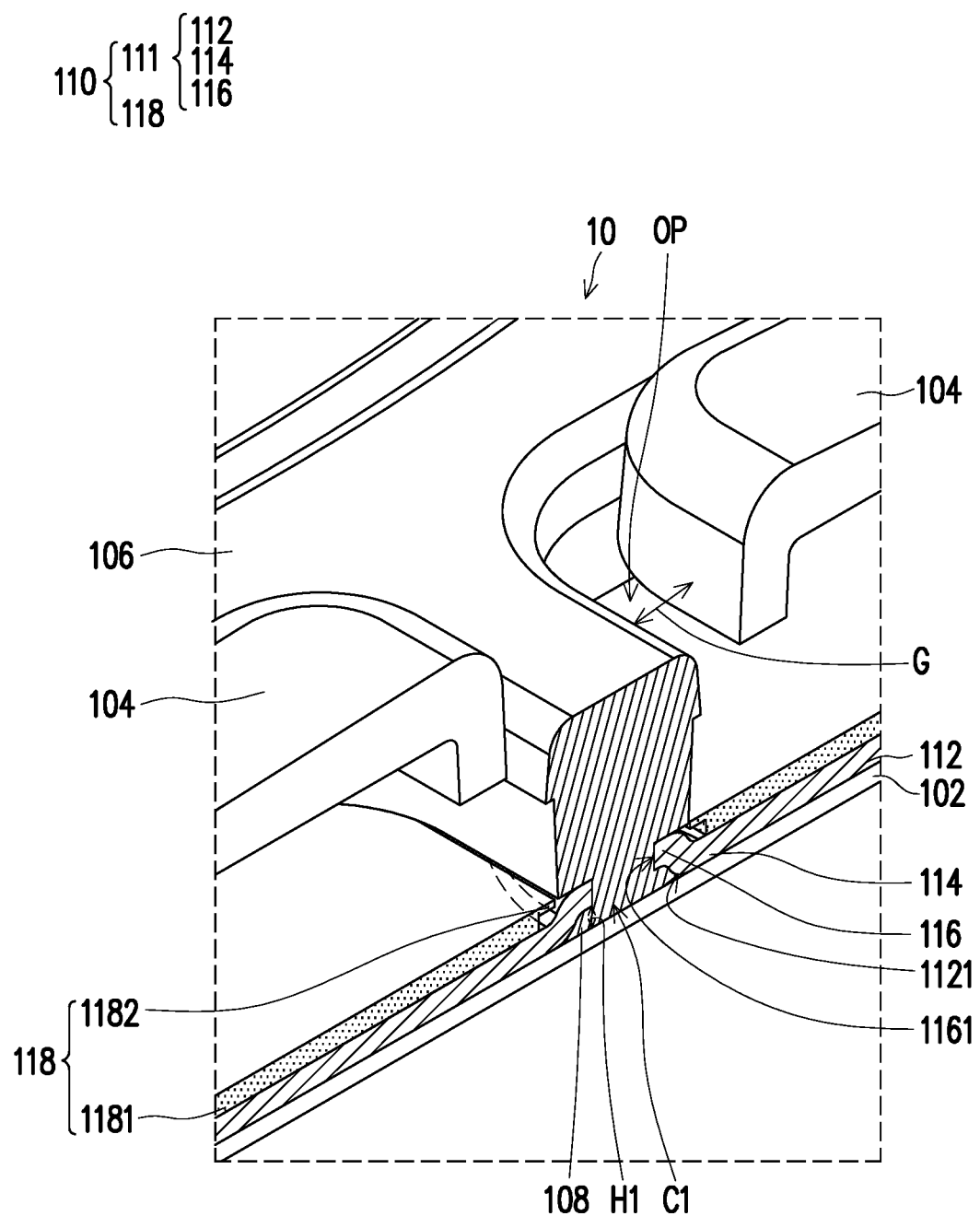
FIG. 2 is a schematic cross-sectional view of an area R along a section line A-A' of FIG. 1.
Figure 3A:
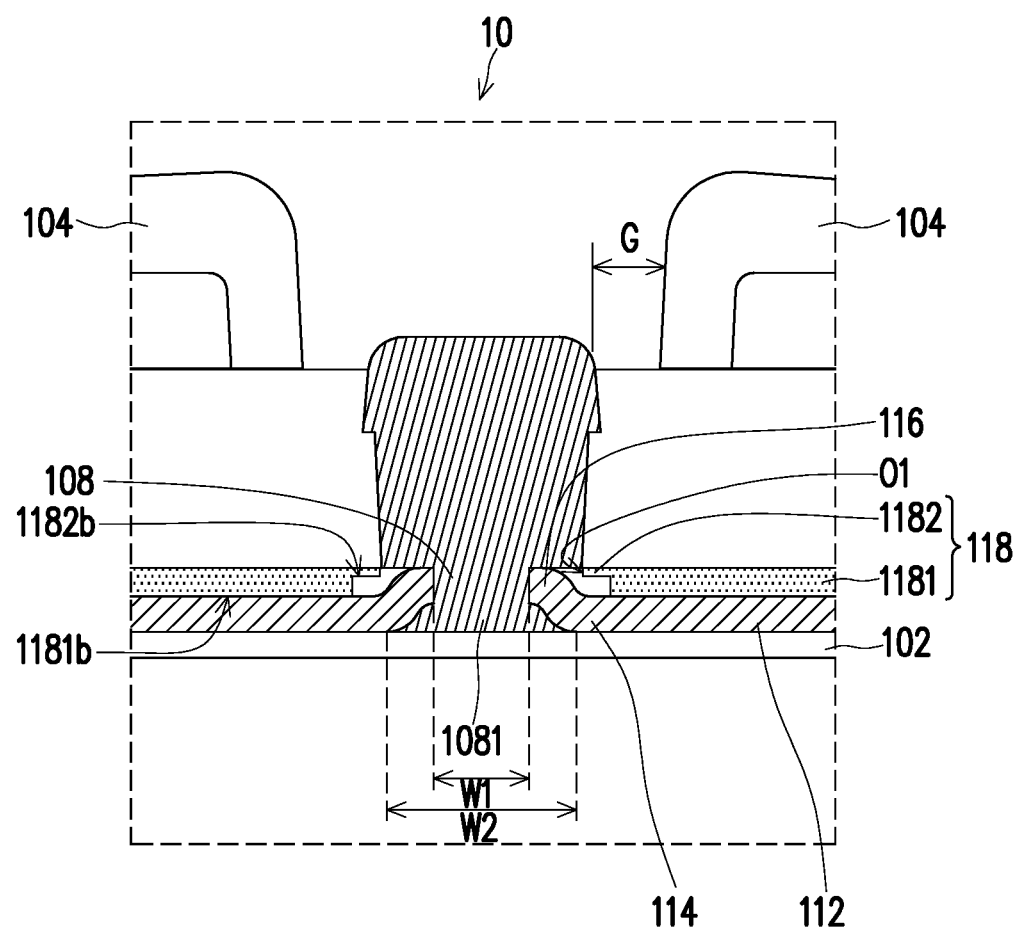
FIG. 3A is a schematic cross-sectional view of FIG. 2 from another perspective.

FIG. 1 is a schematic top view of a keyboard according to an embodiment of the disclosure. FIG. 2 is a schematic cross-sectional view of an area R along a section line A-A' of FIG. 1. FIG. 3A is a schematic cross-sectional view of FIG. 2 from another perspective. Please refer to FIG. 1, FIG. 2 and FIG. 3A at the same time. A keyboard 10 of the present embodiment includes a housing 102, multiple key units 104, a frame 106, and a positioning member 110. The multiple key units 104 are disposed in the housing 102, and the multiple key units 104 may move up and down relative to the housing 102 to activate corresponding key switches. The frame 16 has multiple openings OP to respectively expose the multiple key units 104. The frame 106 is stacked on the housing 102. In an embodiment, the frame 106 sandwiched between two adjacent key units 104 respectively has a gap G with the two adjacent key units 104. In an embodiment, the material of the frame 106 may be a plastic material, but the disclosure is not limited to thereto. In addition, the keyboard 10 of the present embodiment further includes a joint member 108. The joint member 108 and the positioning member 110 are respectively disposed on the frame 106 and the housing 102, such that the housing 102 and the frame 106 are engaged by the positioning member 110.

Moreover, the positioning member 110 of the present embodiment is for fastening with the joint member 108. The positioning member 110 includes a bottom plate 111 and a shielding layer 118. The bottom plate 111 has a body part 112 and a protruding part 116, in which the body part 112 has a connection part 114 and a via hole 1121, and the protruding part 116 has a through hole 1161. The through hole 1161 corresponds to the via hole 1121 and is provided for the joint member 108 to pass through. The body part 112 is upwardly connected to the protruding part 116 through the connection part 114, such that the body part 112, the connection part 114, and the protruding part 116 jointly enclose an accommodating space C1 below the through hole 1161, in which the protruding part 116 has a height relative to the body part 112. In other words, the protruding part 116 surrounds the through hole 1161 to connect to the body part 112 and protrudes upward relative to the body part 112, such that the body part 112, the connection part 114 and the protruding part 116 jointly enclose the accommodating space C1 below the through hole 1161, in which the accommodating space C1 has an accommodating height H1. On the other hand, the joint member 108 passes through the through hole 1161 to be fixed in the accommodating space C1 after being hot melted.

In an embodiment, the protruding part 116 may bulge upward from the body part 112 and form a slope. On the other hand, in a top view, the through hole 1161 is circular, but the disclosure is not limited to thereto. In addition, the material of the bottom plate 111 is not limited in the disclosure. The material of the bottom plate 111 may be a metal material or a plastic material, depending on the actual design requirements, without limitation.

Further, the upper section of the accommodating space C1 has a first section width W1 adjacent to the through hole 1161 of the protruding part 116; the lower section of the accommodating space C1 has a second section width W2 adjacent to the via hole 1121 of the body part 112. The second section width W2 is different from the first section width W1. For example, the second section width W2 is larger than the first section width W1. In addition, the joint member 108 can be formed by heat staking material which joining components together that uses a molded stud or molded boss to mechanically retain a mating component. Heat is applied to the stud/boss, softening it. A forming tool may be then used to reshape the material into a head which cross-section is larger than the cross-section of the through hole. Therefore, the joint member 108 having a stud and a head 1081 connected to the stud joins the frame 106 and the housing 102 together, wherein the stud insert into the through hole 1161 to be fixed in the accommodating space C1 via the head 1081. The head 1081 is substantially located in the upper section of the accommodating space C1, and the cross-section area of the head 1081 may be larger than that of the through hole 1161, such that the head 1081 is engaged with the lower surface of the protruding part 116 around the through hole 1161, and a shape of the head 1081 corresponds to a shape of the accommodating space C1.

The shielding layer 118 is disposed on the body part 112, partly extending to the through hole 1161 of the protruding part 116 to shield the protruding part 116 exposed by the joint member 108, therefore the keyboard 10 containing the shielding layer 118 can prevent the protruding part 116 from being seen during use and upgrade the aesthetics for better user experience. For example, the shielding layer 118 may have a main part 1181 and an extension part 1182. The main part 1181 is disposed on the body part 112. The extension part 1182 extends from a side of the main part 1181 toward the protruding part 116, and the extension part 1182 covers at least part of the protruding part 116 exposed between the body part 112 and the joint member 108. Therefore, the extension part 1182 may cover the part of the protruding part 116 exposed by the gap G, so the keyboard 10 containing the shielding layer 118 can prevent the protruding part 116 from directly being seen by the user during use and upgrade the aesthetics for better user experience.

In the present embodiment, the main part 1181 may be located only on the body part 112; in other words, the main part 1181 does not need to contact the protruding part 116. In an embodiment, a distance may be provided between the main part 1181 and the protruding part 116. In other words, part of the body part 112 may be exposed between the main part 1181 and the protruding part 116 so as to enhance the flatness of the shielding layer 118 on the bottom plate 111, but the disclosure is not limited thereto. On the other hand, the extension part 1182 does not need to extend to between the joint member 108 and the protruding part 116. For example, as shown in FIG. 2 and FIG. 3A, a side of the extension part 1182 close to the protruding part 116 does not need to exceed a side of the body part 112 close to the protruding part 116. The side of the extension part 1182 close to protruding part 116 may be substantially aligned with the side of body part 112 close to protruding part 116, but the disclosure is not limited thereto. The relative position between the extension part 1182 and the body part 112 may be adjusted according to actual requirements, and still belongs to the protection scope of the disclosure as long as the extension part 1182 at least covers the protruding part 116 exposed by the joint member 108.

In an embodiment, the extension part 1182 does not contact the joint member 108 and the bottom plate 111, and the joint member 108 is in direct contact with the bottom plate 111. For example, the extension part 1182 does not need to contact the joint member 108 and the protruding part 116 of the bottom plate 111, such that a gap is provided between the extension part 1182 and the joint member 108, and the joint member 108 is in direct contact with the protruding part 116 of the bottom plate 111. On the other hand, the extension part 1182 has a hole O1. The size of the hole O1 may be larger than the size of the through hole 1161, and the protruding part 116 and part of the joint member 108 are located in the hole O1.

In an embodiment, the main part 1181 and the extension part 1182 may have different thicknesses. For example, the thickness of the extension part 1182 may be smaller than the thickness of the main part 1181, as shown in FIG. 2 and FIG. 3A. In other words, a bottom surface 1182b of the extension part 1182 is higher than a bottom surface 1181b of the main part 1181, such that the boundary between the extension part 1182 and the main part 1181 has a step structure.

In an embodiment, the surface of the shielding layer 118 may also be surface treated, by non-reflective treatment for example, such as by black paint printing on the surface. In an embodiment, the surfaces of the main part 1181 and the extension part 1182 of the shielding layer 118 are painted black and a non-reflective shielding layer 118 is provided.

In an embodiment, the shielding layer 118 may be a black thin-film circuit board, so the protruding part 116 of the keyboard 10 does not require additional processes such as black spray treatment, which is needed when other less environmentally friendly black materials are used, thereby further simplifying the production process of the keyboard 10 and facilitating environmental protection in which less pollution is produced.

The shielding layer 118 may be a multilayer structure. The multilayer structure is, for example, a three-layer structure in which a lower layer, a middle layer, and an upper layer are sequentially stacked on the bottom plate 111. The thickness of each layer in the multilayer structure may be different, but the disclosure is not limited thereto. The proportion of the thickness of each layer in the multilayer structure may be determined according to actual design requirements. In the present embodiment, the extension part 1182 may be extended from one layer of the multilayer structure. For example, as shown in FIG. 2 and FIG. 3A, the extension part 1182 may be extended from the upper layer. In other words, compared with an edge of the middle layer and an edge of the lower layer, an edge of the upper layer is closer to the protruding part 116.

In an embodiment, the thickness of the lower layer of the shielding layer 118 may be 0.075 millimeters (mm); the thickness of the middle layer may be 0.038 mm; and the thickness of the upper layer may be 0.06 mm. However, the disclosure is not limited thereto. The proportion of the thickness of each layer in the multilayer structure may be determined according to actual design requirements.

It should be noted that an area R of the keyboard 10 in the present embodiment may be an area between any two adjacent key unit 104 on the keyboard 10, and is not limited to the area shown in FIG. 1. In addition, the following embodiments follow the component numbers and part of the content of the previous embodiment, in which the same numerals are used to represent the same or similar components, and the description of the same technical content is omitted. The description of the omitted parts can be referred to in the foregoing embodiment, and will not be repeated in the following embodiments.

Figure 3B:
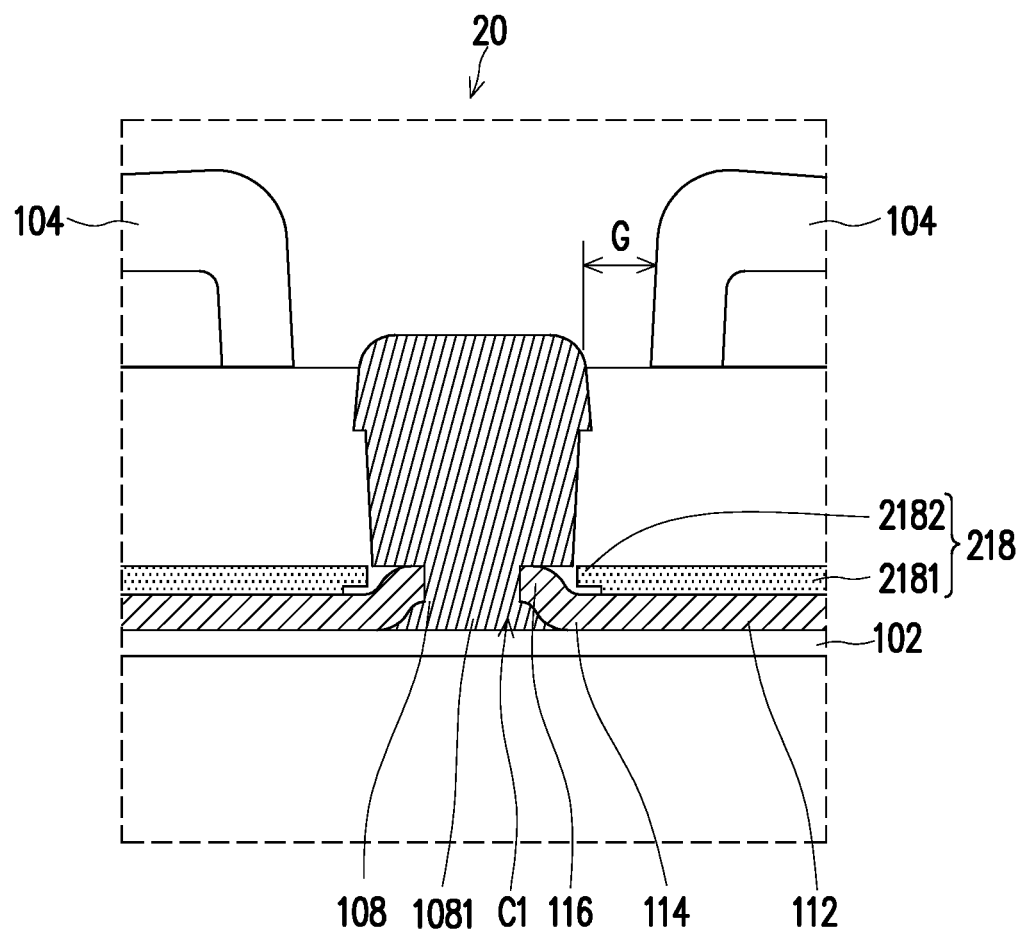
FIG. 3B is a schematic cross-sectional view of a keyboard according to another embodiment of the disclosure.

FIG. 3B is a schematic cross-sectional view of a keyboard according to another embodiment of the disclosure. Please refer to FIG. 3B. A keyboard 20 of the present embodiment is similar to the keyboard 10 of FIG. 3A. The difference between the two that an extension part 2182 of a shielding layer 218 may be extended from two layers in the multilayer structure. For example, the extension part 2182 of the shielding layer 218 may be extended from the upper layer and the middle layer in the three-layer structure. In other words, compared with the edge of the lower layer, the edge of the upper layer and the edge of the middle layer are closer to the protruding part 116. In the present embodiment, as shown in FIG. 3B, the edge of the upper layer may be substantially aligned with the edge of the middle layer, but the disclosure is not limited thereto. In an embodiment not shown, compared with the edge of the middle layer, the edge of the upper layer may also be closer to the joint member 108, such that the boundary between the extension part 2182 and the main part 2181 has a two-step structure.

Figure 3C:
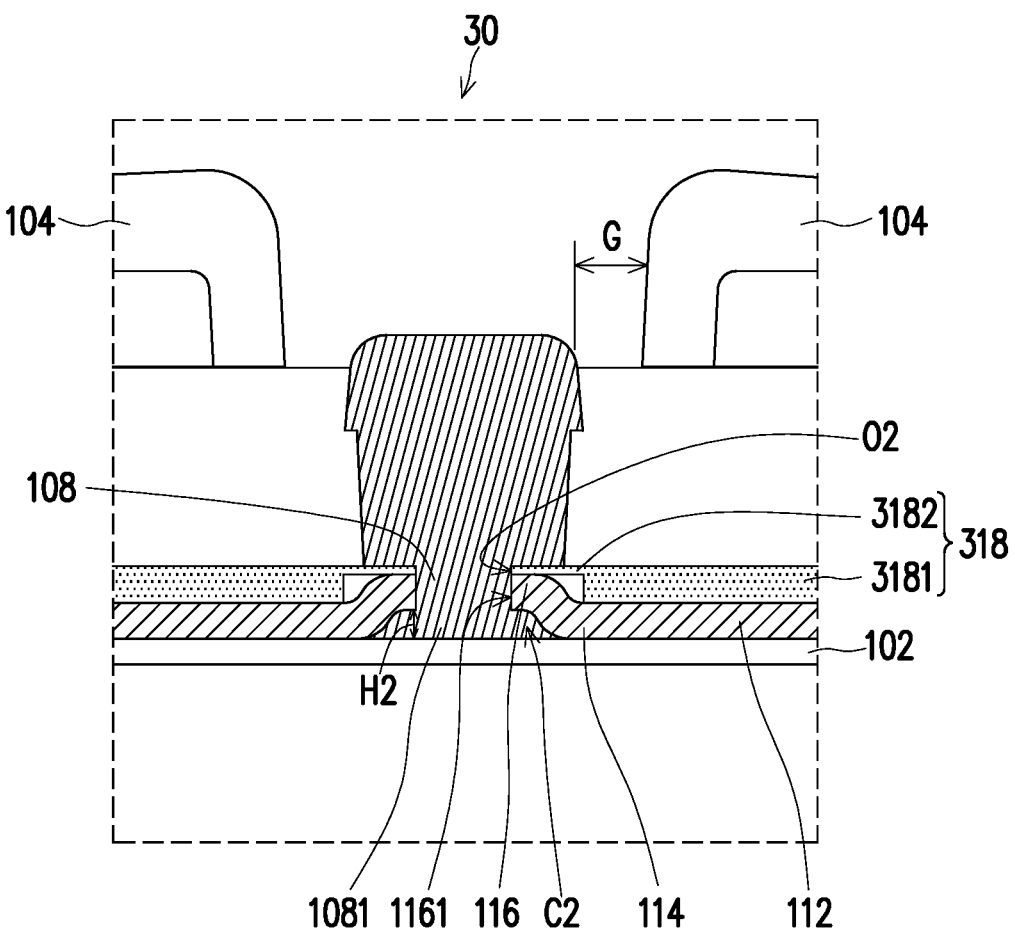
FIG. 3C is a schematic cross-sectional view of a keyboard according to yet another embodiment of the disclosure.

FIG. 3C is a schematic cross-sectional view of a keyboard according to another embodiment of the disclosure. Please refer to FIG. 3C. A keyboard 30 of the present embodiment is similar to the keyboard 10 of FIG. 3A. The difference between the two is that a shielding layer 318 may include a main part 3181 and an extension part 3182, and the a side of extension part 3182 close to the protruding part 116 is extended to between the joint member 108 and the protruding part 116, such that a cavity is formed between the shielding layer 318 and the bottom plate 111. In the present embodiment, since the side of the extension part 3182 of the shielding layer 318 close to the protruding part 116 extends to between the joint member 108 and the protruding part 116, the height of the protruding part 116 relative to the body part 112 is correspondingly reduced, and the accommodating space C2 is also reduced. Therefore, an accommodating height H2 of the accommodating space C2 is smaller than the accommodating height H1 of the accommodating space C1 in FIG. 2.

In the present embodiment, part of the extension part 3182 is covered by the joint member 108, and another part of the extension part 3182 is exposed. In other words, part of the extension part 3182 may be in direct contact with the joint member 108, and another part of the extension part 3182 does not need to be in direct contact with the joint member 108. On the other hand, an edge of the extension part 3182 may be extended to be substantially aligned with an edge of the protruding part 116 close to the joint member 108, such that the size of the hole O2 of the extension part 3182 may be substantially equal to the size of the through hole 1161, in which the protruding part 116 is located below the hole O2 and the joint member 108 is located in the hole O2, but the disclosure is not limited thereto. The edge of extension part 3182 does not need to extend to the edge of protruding part 116 close to the joint member 108, such that the size of the hole O2 of the extension part 3182 may be larger than the size of the through hole 1161. In other words, the extension part 3182 may cover only the part of the protruding part 116 away from the joint member 108, and expose the part of the protruding part 116 close to the joint member 108 (not shown).

Figure 3D:
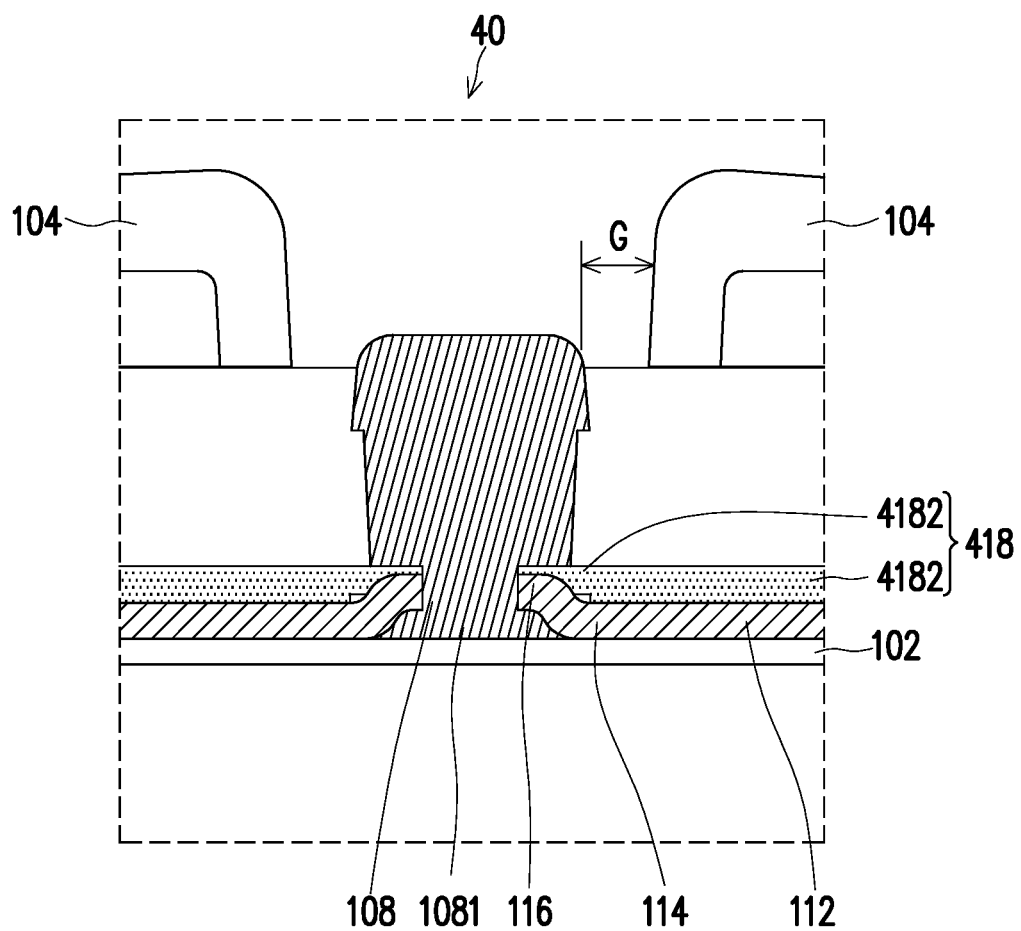
FIG. 3D is a schematic cross-sectional view of a keyboard according to still another embodiment of the disclosure.

FIG. 3D is a schematic cross-sectional view of a keyboard according to yet another embodiment of the disclosure. Please refer to FIG. 3D. A keyboard 40 of the present embodiment is similar to the keyboard 30 of FIG. 3C. The difference between the two is that a shielding layer 418 may include a main part 4181 and an extension part 4182, and the extension part 4182 may be extended from the upper layer and the middle layer in the three-layer structure, in which the extension part 4182 extending from the middle layer may be in direct contact with the protruding part 116 of the bottom plate 111. For example, the extension part 4182 extending from the middle layer may cover the protruding part 116 along the slope of the protruding part 116.

Figure 3E:
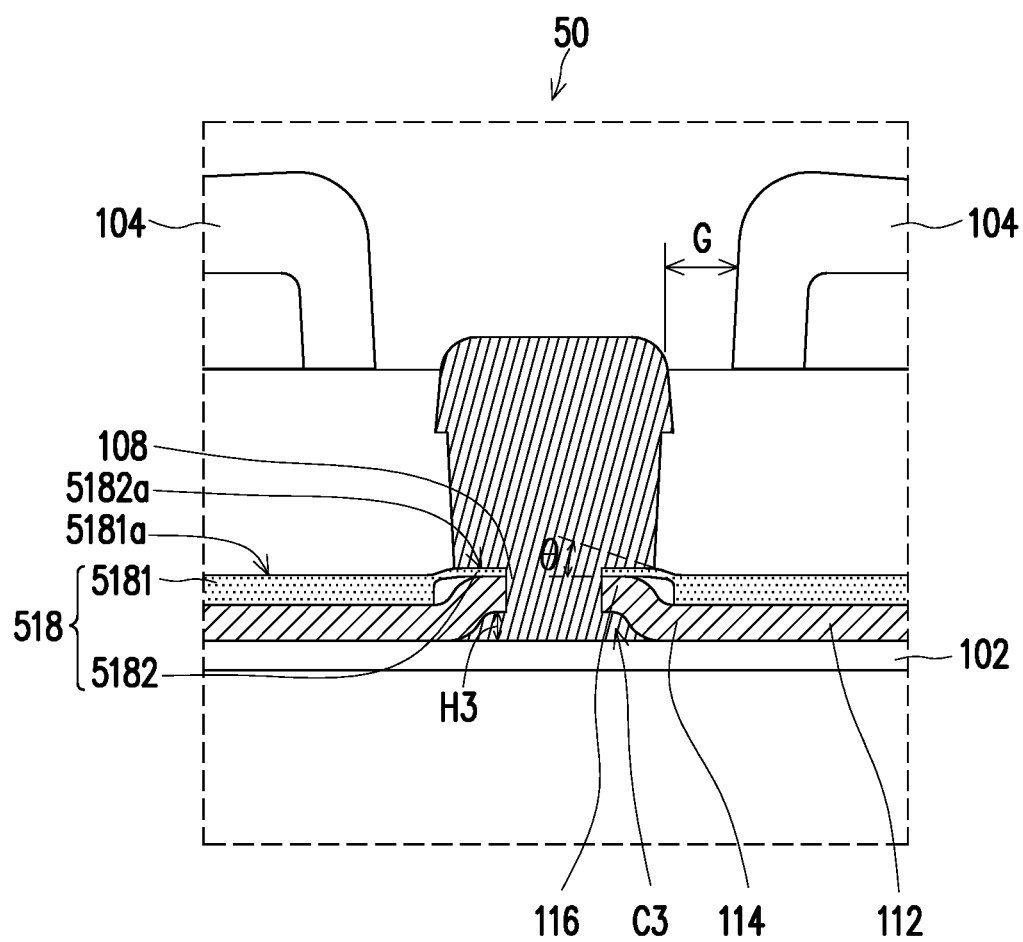
FIG. 3E is a schematic cross-sectional view of a keyboard according to yet still another embodiment of the disclosure.

FIG. 3E is a schematic cross-sectional view of a keyboard according to still another embodiment of the disclosure. Please refer to FIG. 3E. A keyboard 50 of the present embodiment is similar to the keyboard 30 of FIG. 3C. The difference between the two is that a shielding layer 518 may include a main part 5181 and an extension part 5182, and the extension part 5182 extends upward, such that a top surface 5182a of the extension part 5182 is higher than a top surface 5181a of the main part 5181. In other words, the extension part 5182 of the shielding layer 518 may be deformed to extend upwards without extending in the horizontal direction, such that the height of the protruding part 116 relative to the body part 112 may be raised correspondingly. For example, the tangential direction of the part connecting the extension part 5182 and the main part 5181 has an acute angle θ with a top surface of the main part 5181, such that the protruding part 116 of the bottom plate 111 may be closer to the joint member 108, and also an accommodating height H3 of an accommodating space C3 between the joint member 108 and the bottom plate 111 may be larger than the accommodating height H2 of the accommodating space C2 in FIG. 3C. Further, the accommodating height H3 increases as the angle of the acute angle θ increases, therefore, in the present embodiment, the deformation of the extension part 5182 may increase a filling space during hot melt, reduce the probability of the joint member 108 protruding toward lower components (such as backlight module) after the hot melt, and further improve the yield rate of the keyboard 50.

In summary, in the design of the positioning member of the disclosure, the shielding layer is disposed on the body part of the bottom plate, partly extending to the through hole of the protruding part to shield the protruding part exposed by the joint member, therefore the keyboard containing the shielding layer can prevent the protruding part user from directly been seen during use and upgrade the aesthetics for better user experience. Further, the shielding layer may be a black thin-film circuit board, so the protruding part 116 of the keyboard 10 does not require additional processes such as black spray treatment, which is needed when other less environmentally friendly black materials are used, thereby further simplifying the production process of the keyboard 10 and facilitating environmental protection in which less pollution is produced. In addition, the deformation of the extension part may increase a filling space during hot melt, reduce the probability of the joint member protruding toward lower components (such as backlight module) after the hot melt, and further improve the yield rate of the keyboard.

Finally, it should be noted that the above embodiments are only used to illustrate the technical solution of the disclosure, but not limited thereto. Although the disclosure is described in detail with reference to the above-mentioned embodiments, those skilled in the art should understand that the technical solutions described in the above-mentioned embodiments can still be modified, and some or all of the technical features may be replaced equivalently; such modifications or replacements do not depart from the scope of the technical solutions described by the embodiments of the disclosure.

What is claimed is:

1. A keyboard, comprising:
  a bottom plate having a through hole;
  a plurality of key units disposed on the bottom plate and configured to move up and down relative to the bottom plate, wherein the through hole is disposed between two adjacent key unit; and
  a shielding layer disposed on the bottom plate, wherein the shielding layer has an opening corresponding to the through hole and is provided with a black surface to cover a portion of the bottom plate exposed by the key units, and an orthographic projection of the key unit on the shielding layer overlaps the black surface.

2. The keyboard according to claim 1, wherein the bottom plate comprises a slope around the through hole, and an accommodating space is arranged at a position corresponding to the slope.

3. The keyboard according to claim 2, wherein a portion of the shielding layer is arranged along the slope.

4. The keyboard according to claim 1, further comprising a joint member passing through the opening of the shielding layer and the through hole to be engaged with the bottom plate.

5. The keyboard according to claim 4, further comprising a frame disposed on the through hole and connected to the joint member, wherein the frame is arranged between two adjacent key units, and the shielding layer covers a part of the bottom plate exposed by a gap between the frame and the key unit.

6. The keyboard according to claim 1, wherein an accommodating space is disposed on one side of the through hole, and a first section width corresponding to an upper section of the accommodating space is different from a second section width corresponding to a lower section of the accommodating space.

7. The keyboard according to claim 1, wherein the bottom plate comprises a body part and a protruding part, and the protruding part surrounding the through hole has a distance relative to the body part in height.

\* \* \* \* \*